(12) United States Patent
Hachiya et al.

(10) Patent No.: US 11,517,007 B2
(45) Date of Patent: Dec. 6, 2022

(54) PEST CONTROL APPARATUS

(71) Applicant: PANASONIC INTELLECTUAL PROPERTY MANAGEMENT CO., LTD., Osaka (JP)

(72) Inventors: Yoshiaki Hachiya, Shiga (JP); Kazushige Sugita, Hyogo (JP); Takashi Maniwa, Osaka (JP); Makoto Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 455 days.

(21) Appl. No.: 15/666,768

(22) Filed: Aug. 2, 2017

(65) Prior Publication Data

US 2018/0049421 A1 Feb. 22, 2018

(30) Foreign Application Priority Data

Aug. 18, 2016 (JP) .............................. JP2016-160760

(51) Int. Cl.
| | |
|---|---|
| *A01M 1/22* | (2006.01) |
| *A01G 9/20* | (2006.01) |
| *A01G 7/04* | (2006.01) |
| *A01M 29/10* | (2011.01) |

(52) U.S. Cl.
CPC .............. *A01M 1/226* (2013.01); *A01G 7/045* (2013.01); *A01G 9/20* (2013.01); *A01M 29/10* (2013.01); *Y02P 60/14* (2015.11)

(58) Field of Classification Search
CPC ...... A01M 1/226; A01M 21/00; A01M 21/04; A01G 9/20
See application file for complete search history.

(56) References Cited

U.S. PATENT DOCUMENTS

| | | | | |
|---|---|---|---|---|
| 1,521,323 | A * | 12/1924 | Reeder | A01M 1/04 43/113 |
| 4,029,954 | A * | 6/1977 | Moyer | F21L 4/085 362/183 |

(Continued)

FOREIGN PATENT DOCUMENTS

| | | | | | |
|---|---|---|---|---|---|
| GB | | 2418979 A | * | 4/2006 | ............. F21V 11/00 |
| JP | 2005-328702 A | | | 12/2005 | |

(Continued)

OTHER PUBLICATIONS

Murata et al., "Lethal Effects of UVB Radiation and Photoreactivation in Spider Mites", Plant Protection 68 (9), Sep. 2014, pp. 539-543.

*Primary Examiner* — Peter M Poon
*Assistant Examiner* — Morgan T Jordan
(74) *Attorney, Agent, or Firm* — Greenblum & Bernstein, P.L.C.

(57) ABSTRACT

An apparatus for controlling plant pests includes a portable case and a light source held in the case. The light source emits ultraviolet light in a predetermined direction. The case includes an installation assembly configured to be installed in a culture medium of the plant so that the predetermined direction is upward. An optical component that removes a wavelength component larger than 340 nm from the ultraviolet light emitted by the light source may also be provided.

8 Claims, 8 Drawing Sheets

(56) References Cited

U.S. PATENT DOCUMENTS

| | | | | |
|---|---|---|---|---|
| 5,259,153 A * | 11/1993 | Olive | A01M 1/145 | 136/291 |
| 6,468,433 B1 * | 10/2002 | Tribelski | A01M 1/226 | 210/748.06 |
| 6,641,283 B1 * | 11/2003 | Bohler | F21V 21/08 | 362/238 |
| 6,729,742 B2 * | 5/2004 | Wismeth | F21S 9/037 | 136/206 |
| 7,196,477 B2 * | 3/2007 | Richmond | F21S 9/037 | 315/149 |
| 7,390,104 B2 * | 6/2008 | Coushaine | F21S 9/02 | 362/184 |
| 7,766,504 B1 * | 8/2010 | Holin | F21S 9/035 | 362/178 |
| 7,878,678 B1 * | 2/2011 | Stamatatos | B60Q 1/2615 | 362/184 |
| 7,950,819 B2 * | 5/2011 | Wells | F21V 17/108 | 362/157 |
| 7,997,749 B2 * | 8/2011 | Kim | H01L 33/62 | 362/97.3 |
| 8,104,928 B1 * | 1/2012 | Horn | F21V 17/164 | 362/287 |
| 8,545,066 B2 * | 10/2013 | Coleman | F21V 21/145 | 362/421 |
| 8,844,192 B2 | 9/2014 | Yamada et al. | | |
| 8,872,136 B1 * | 10/2014 | Jackson | A01M 21/00 | 250/492.1 |
| 9,851,062 B1 * | 12/2017 | Davis | F21S 2/005 | |
| 10,117,385 B2 * | 11/2018 | Jenner | A01G 7/045 | |
| 10,390,407 B2 * | 8/2019 | Vidal | H05B 37/0227 | |
| 10,433,492 B2 * | 10/2019 | Sulejmani | A01G 7/045 | |
| 2004/0184263 A1 * | 9/2004 | Patti | E01C 17/00 | 362/145 |
| 2005/0135101 A1 * | 6/2005 | Richmond | F21S 9/037 | 362/276 |
| 2007/0133191 A1 * | 6/2007 | Ma | A45B 3/04 | 362/102 |
| 2008/0062690 A1 * | 3/2008 | Ip | F21S 6/004 | 362/249.12 |
| 2008/0120736 A1 * | 5/2008 | Hurst | A01G 7/045 | 800/276 |
| 2008/0253113 A1 * | 10/2008 | Tu | F21S 6/004 | 362/183 |
| 2010/0008081 A1 * | 1/2010 | Canino | A01G 9/26 | 362/191 |
| 2010/0193707 A1 * | 8/2010 | Yamada | A01G 7/045 | 250/492.1 |
| 2011/0016785 A1 | 1/2011 | Yamada et al. | | |
| 2011/0163246 A1 | 7/2011 | Ishiwata et al. | | |
| 2012/0038293 A1 * | 2/2012 | Guerrieri | F21S 9/02 | 315/313 |
| 2012/0176765 A1 | 7/2012 | Uchida et al. | | |
| 2012/0210637 A1 * | 8/2012 | Kamahara | A01G 7/045 | 47/17 |
| 2012/0281413 A1 * | 11/2012 | Lewis | A01G 7/045 | 362/249.11 |
| 2013/0298445 A1 | 11/2013 | Aoki et al. | | |
| 2013/0301258 A1 | 11/2013 | Aoki et al. | | |
| 2014/0090291 A1 * | 4/2014 | Eldesouk | A01M 99/00 | 43/124 |
| 2014/0250778 A1 * | 9/2014 | Suntych | A01G 7/045 | 47/1.4 |
| 2014/0311014 A1 * | 10/2014 | Feugier | A01M 1/226 | 43/107 |
| 2015/0128489 A1 | 5/2015 | Yamada et al. | | |
| 2015/0181811 A1 * | 7/2015 | Krijn | A01G 7/045 | 47/58.1 LS |
| 2016/0100529 A1 * | 4/2016 | Grajcar | A01G 7/045 | 47/17 |
| 2016/0278300 A1 * | 9/2016 | Clendinning | A01G 22/00 | |
| 2016/0286779 A1 * | 10/2016 | Guice | A63F 9/0243 | |
| 2016/0302403 A1 * | 10/2016 | Kamahara | A01G 7/045 | |
| 2016/0345512 A1 * | 12/2016 | Wargent | H05B 33/0869 | |
| 2016/0356465 A1 * | 12/2016 | Polete | H05B 37/029 | |
| 2016/0360714 A1 * | 12/2016 | Ishidou | A01G 31/02 | |
| 2016/0366833 A1 * | 12/2016 | Pohjanvouri | A01G 22/00 | |
| 2017/0020084 A1 * | 1/2017 | Alfier | F21V 29/503 | |
| 2017/0020122 A1 * | 1/2017 | Mirzakhani Nafchi | A01M 17/00 | |
| 2017/0086391 A1 * | 3/2017 | Vilgiate | A01G 7/045 | |
| 2017/0156304 A1 | 6/2017 | Hori et al. | | |
| 2017/0202157 A1 * | 7/2017 | Onac | A01G 9/20 | |
| 2017/0290318 A1 * | 10/2017 | Bergengren | A01M 1/08 | |
| 2017/0311553 A1 * | 11/2017 | Dobrinsky | A01G 7/045 | |
| 2017/0347532 A1 * | 12/2017 | Suntych | A01G 7/045 | |
| 2018/0070537 A1 * | 3/2018 | Vasilenko | H05B 37/0281 | |
| 2018/0213735 A1 * | 8/2018 | Vail | A01G 31/06 | |
| 2018/0249644 A1 * | 9/2018 | Kivioja | F21V 17/105 | |
| 2018/0288948 A1 * | 10/2018 | Croteau | A01G 9/16 | |

FOREIGN PATENT DOCUMENTS

| | | | |
|---|---|---|---|
| JP | 2005-328734 A | 12/2005 | |
| JP | 2009-022175 A | 2/2009 | |
| JP | 2009-261289 A | 11/2009 | |
| JP | 2009-261311 A | 11/2009 | |
| JP | 2010-094109 A | 4/2010 | |
| JP | 2010-252671 A | 11/2010 | |
| JP | 2010-267591 A | 11/2010 | |
| JP | 2010-273546 A | 12/2010 | |
| JP | 2011-000115 A | 1/2011 | |
| JP | 2011-024504 A | 2/2011 | |
| JP | 2012-000061 A | 1/2012 | |
| JP | 2012-170361 A | 9/2012 | |
| JP | 2012-183014 A | 9/2012 | |
| JP | 5162740 B2 | 3/2013 | |
| JP | 2013-123417 A | 6/2013 | |
| JP | 5219245 B2 | 6/2013 | |
| JP | 2013-230122 A | 11/2013 | |
| JP | 2014-200205 A | 10/2014 | |
| JP | 2015-171356 A | 10/2015 | |
| JP | 2016-007185 A | 1/2016 | |
| WO | WO-2005036053 A1 * | 4/2005 | B05B 17/08 |
| WO | 2009/011349 A1 | 1/2009 | |
| WO | 2009/131008 A1 | 10/2009 | |
| WO | 2010/047277 A1 | 4/2010 | |
| WO | 2013/015442 A1 | 1/2013 | |
| WO | 2015/079767 A1 | 6/2015 | |

* cited by examiner

PEST CONTROL APPARATUS

CROSS REFERENCE TO RELATED APPLICATION

This application claims the benefit of priority of Japanese Patent Application Number 2016-160760 filed on Aug. 18, 2016, the entire content of which is hereby incorporated by reference.

BACKGROUND

1. Technical Field

The present disclosure relates to pest control apparatuses for plants.

2. Description of the Related Art

Illumination apparatuses that control plant disease by irradiating a plant with ultraviolet light are conventionally known (for example, see Japanese Unexamined Patent Application Publication No. 2009-22175 (Patent Literature 1)). The illumination apparatus in Patent Literature 1 includes a light source that overlappingly emits UV-B light and UV-C light, and a filter that removes wavelength components less than or equal to 255 nm from the UV-C light. The illumination apparatus irradiates a plant with ultraviolet light to thereby control disease of the plant. Furthermore, for example, Plant Protection 68 (9), 539-543, 2014 September, "Lethal Effects of UVB Radiation and Photoreactivation in Spider Mites" (Non-Patent Literature 1) discloses that irradiating spider mites with UV-B light has the effect of reducing survival rate and reducing the number of eggs laid, etc.

SUMMARY

However, in the above-described conventional illumination apparatuses, not being able to locally irradiate plants with light is problematic.

For example, since the conventional illumination apparatuses emit light from above the plant and are not capable of directly irradiating the underside of the leaves of the plant with light, the controlling effect on insect pests such as spider mites inhabiting the underside of the leaves of the plant is weak. Furthermore, even if an illumination apparatus were to be installed on the side or below the plant, depending on the placement mode, shaded portions of the plant cannot be sufficiently irradiated with light.

In view of this, the present disclosure provides a pest control apparatus which is capable of localized ultraviolet light irradiation of plants and has excellent pest controlling effect.

A pest control apparatus according to an aspect of the disclosure is a pest control apparatus that controls a pest of a plant, and includes: a main body case which is portable; and a light source which is held in the main body case and emits ultraviolet light, wherein the main body case includes an installing structure which is to be installed in a culture medium of the plant such that an emission direction of the ultraviolet light emitted by the light source is upward.

According to the present disclosure, it is possible to provide a pest control apparatus which is capable of localized ultraviolet light irradiation of plants and has excellent pest controlling effect.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, a pest control apparatus according to an exemplary embodiment of the present disclosure will be described in detail with reference to the drawings. It should be noted that the subsequently-described exemplary embodiment shows a specific example of the present invention. Therefore, numerical values, shapes, materials, structural components, the arrangement and connection of the structural components, steps, and the sequence of the steps, etc. shown in the following exemplary embodiment are mere examples, and are not intended to limit the scope of the present disclosure. Furthermore, among the structural components in the following exemplary embodiment, components not recited in any one of the independent claims which indicate the broadest concepts of the present invention are described as arbitrary structural components.

Furthermore, the respective figures are schematic diagrams and are not necessarily precise illustrations. Therefore, for example, the scales, etc. in the respective figures are not necessarily uniform. Furthermore, in the respective figures, substantially identical components are assigned the same reference signs, and overlapping description thereof is omitted or simplified.

Embodiment

[Configuration]

Figure 1:
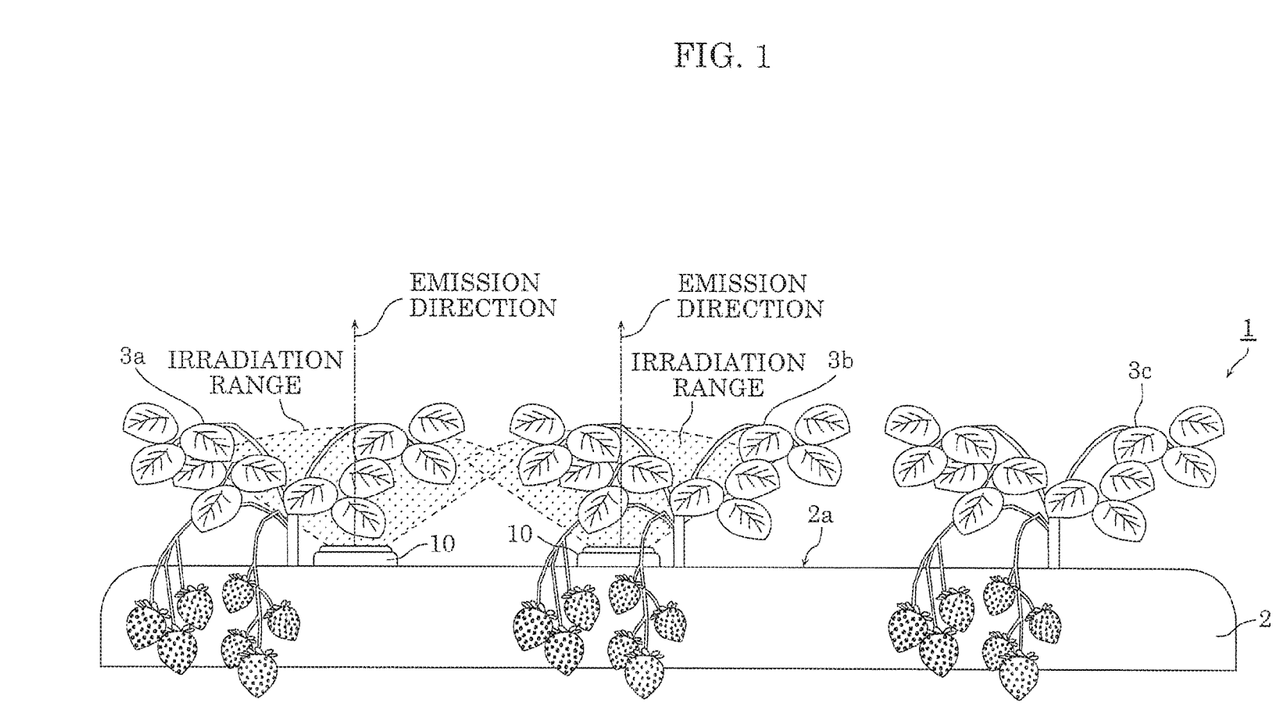
FIG. 1 is a schematic diagram illustrating a pest control system including a pest control apparatus according to an embodiment.

First, a configuration of a pest control apparatus according to this embodiment will be described with reference to FIG. 1. FIG. 1 is a schematic diagram illustrating pest control system 1 including pest control apparatus 10 according to this embodiment.

Pest control system 1 controls pests occurring on plants in, for example, closed plant production systems (what are called plant factories), cultivating facilities such as agricultural plastic greenhouses or glasshouses, or outdoor cultivation, etc.

Pests include filamentous bacteria (molds) such as gray mold, white mold, tomato early blight, leaf spot disease, powdery mildew, downy mildew, anthracnose, etc., and mites such as spider mites.

Plants include vegetables, fruits, flowers, ornamental plants, etc. FIG. 1 illustrates three plants 3a to 3c planted in ridge 2. Plants 3a to 3c are plants of the same type, for example, strawberries, but are not limited to such. Plants 3a to 3c may be mutually different types of plants.

Ridge 2 is an example of a culture medium for growing plants, and is a long narrow linear mound of raised soil. Plants 3a to 3c are sequentially planted at a predetermined interval along the direction of extension of ridge 2. It should be noted that plants 3a to 3c may be planted in flat soil.

In this embodiment, pest control system 1 includes at least one pest control apparatus 10. In the example in FIG. 1, pest control system 1 includes two pest control apparatuses 10. The two pest control apparatuses 10 are placed on ridge surface 2a at the base of plant 3a and on ridge surface 2a at the base of plant 3b, respectively.

Hereinafter, the configuration of pest control apparatus 10 will be described in detail.

[Pest Control Apparatus]

Figure 2:
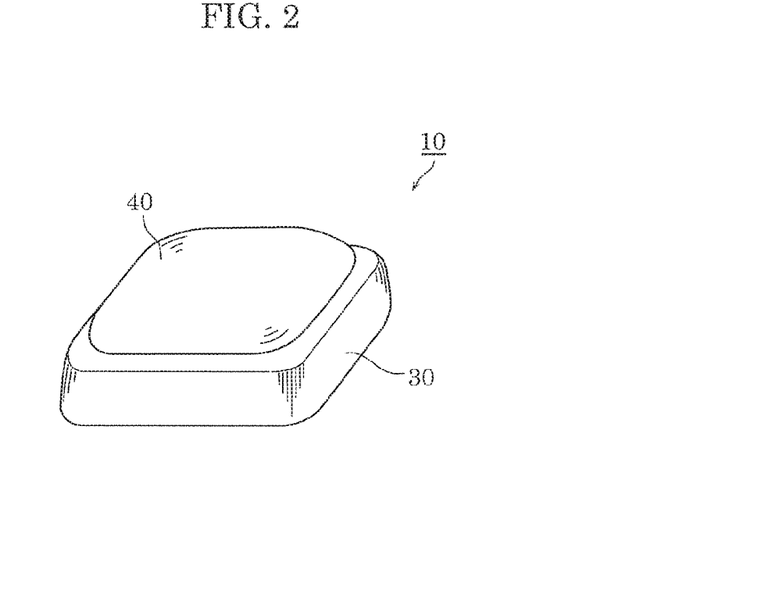
FIG. 2 is an outline perspective view of the pest control apparatus according to the embodiment.
Figure 3:
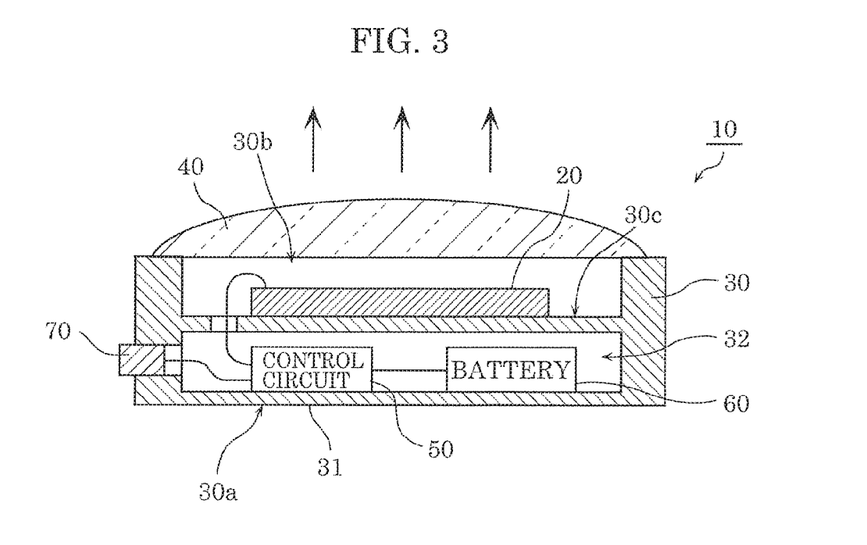
FIG. 3 is a schematic cross-sectional view of the configuration of the pest control apparatus according to the embodiment.

FIG. 2 is an outline perspective view of illumination apparatus 10 according to this embodiment. FIG. 3 is a schematic cross-sectional view of the configuration of pest control apparatus 10 according to this embodiment.

As illustrated in FIG. 2, pest control apparatus 10 includes optical component 40 disposed on the top face of case 30 which is flat and substantially square in plan view. Pest control apparatus 10 emits, in a predetermined direction, ultraviolet light emitted from light source 20 (see FIG. 3) housed inside case 30. The predetermined direction is the emission direction of the ultraviolet light emitted by pest control apparatus 10, and is, for example, the direction in which irradiance is strongest. Hereinafter, there are instances where the predetermined direction is referred to as the "optical axis direction".

As illustrated in FIG. 3, pest control apparatus 10 includes light source 20, case 30, optical component 40, control circuit 50, battery 60, and switch 70. It should be noted that FIG. 3 schematically illustrates a cross-section obtained when pest control apparatus 10 in FIG. 2 is cut along a plane including the optical direction.

Light source 20 is a light emitter which emits ultraviolet light. In this embodiment, light source 20 emits ultraviolet light according to power supplied from battery 60. The ultraviolet light, for example, includes UV-B light having a peak wavelength within a range of from 280 nm to 340 nm, inclusive.

Light source 20 is, for example, a discharge lamp which emits light including UV-B light, such as a fluorescent lamp, a mercury lamp, a metal halide lamp, or a xenon lamp, but is not limited to such. For example, light source 20 may be a solid-state light-emitting element such as a light emitting diode (LEI)) element, a laser element, or an organic electroluminescent (EL) element.

Figure 4:
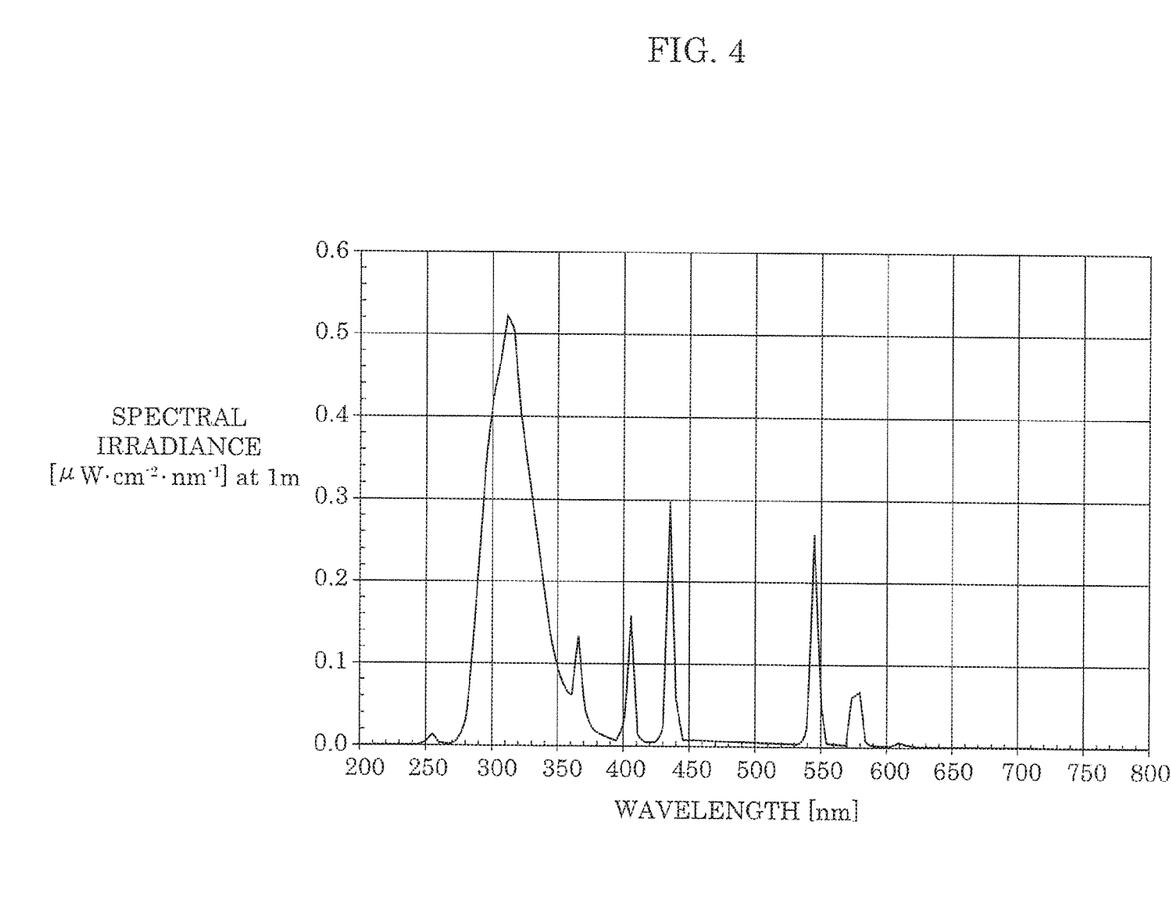
FIG. 4 is a graph illustrating a spectral distribution of light emitted by the pest control apparatus according to the embodiment.

FIG. 4 is a graph illustrating a spectral distribution of light emitted by light source 20 according to this embodiment. It should be noted that, in FIG. 4, the horizontal axis represents wavelength and the vertical axis represents spectral irradiance (equivalent to light intensity) at a point that is 1 m in front of light source 20.

The light with which light source 20 irradiates the plants includes UV-B light whose peak wavelength in the maximum light emission peak is included in a range of from 280 nm to 340 nm, inclusive, as illustrated in FIG. 4. By irradiating the plants with UV-B light, formation of spores and growth of mycelia of filamentous bacteria which causes powdery mildew can be suppressed.

Case 30 is a portable main body case. Case 30, together with optical component 40, serves as an outer shell of pest control apparatus 10.

In this embodiment, portable means capable of being easily carried by a person. Specifically, case 30 is of a size and weight that can be carried by a person using one hand or both hands. For example, the width of one side of case 30 in plan view is from several centimeters to several tens of centimeters. In this embodiment, pest control apparatus 10 is small, lightweight, and portable. For example, the weight of pest control apparatus 10 is at most several hundred grams or at most several kilograms.

Case 30 is, for example, a flat, bottomed, tubular container, and includes base 30a, opening 30b, and placement face 30c. Base 30a is a base on the outer side of the bottom portion of case 30, and is for example a flat face. Opening 30b is covered by optical component 40. Placement face 30c is a base on the inner side of the bottom portion of case 30, and is the face on which light source 20 is placed. Case 30 is formed using, for example, a resin material such as polybutylene terephthalate (PBT) or a metal material.

Case 30 holds light source 20. Specifically, case 30 internally houses light source 20 such that the light emission direction (optical axis) of light source 20 is orthogonal to base 30a. Specifically, light source 20 is placed on and fixed to placement face 30c. The ultraviolet light from light source 20 is emitted to the outside via opening 30b and optical component 40. The upward arrow symbols illustrated in FIG. 3 indicate the emission direction of the ultraviolet light from light source 20.

Case 30 includes installing structure 31 which is to be installed in the culture medium of the plants such that the emission direction of light is upward. Installing structure 31 is for example a part of case 30 and is a portion that is to be installed in the culture medium such that the emission direction of the ultraviolet light emitted by light source 20 is a direction that is substantially orthogonal to the culture medium of the plants. In this embodiment, installing structure 31 is base 30a of case 30.

As illustrated in FIG. 1, each pest control apparatus 10 is installed in ridge 2 by installing base 30a of case 30 on ridge surface 2a which is the top surface of ridge 2. Accordingly, the emission direction of the ultraviolet light emitted by pest control apparatus 10 is upward. When ridge surface 2a is a horizontal surface, the emission direction of the ultraviolet light is perpendicularly upward. Accordingly, the plants can be irradiated with ultraviolet light from directly below, and thus parts that are difficult to irradiate with light from above, such as the undersides of leaves, can be irradiated with ultraviolet light.

As illustrated in FIG. 3, case 30 includes housing 32 which houses battery 60. Housing 32 is a space provided at the bottom portion (between placement face 30c and base 30a) of case 30. As illustrated in FIG. 3, control circuit 50 may be housed in housing 32. A lid (not illustrated in the figure) that opens and closes housing 32 may be provided in case 30 for replacing battery 60.

It should be noted that although an example in which the space (the space between opening 30b and placement face 30c) housing light source 20 and the space (housing 32)

housing battery 60, etc., are separated is shown in this embodiment, the configuration is not limited to such. Light source 20, control circuit 50, and battery 60 may be placed in a single space inside case 30.

Optical component 40 is located forward (i.e., on the light emission side) of light source 20, and is fixed to case 30. It should be noted that a gap between case 30 and optical component 40 may be sealed using a water-resistant adhesive, etc., in order to prevent the entry of moisture. Alternatively, case 30 may be covered by optical component 40. Optical component 40 is formed using a material that is resistant to ultraviolet light. Optical component 40 is formed using, for example, a transparent resin material such as acrylic (PMMA) or a glass material such as quartz glass.

Optical component 40, for example, causes the light emitted by light source 20 to diffuse (scatter) and exit as diffused light. Specifically, a light-diffusing structure such as bumps and grooves may be formed on the light exit surface of optical component 40 or light-diffusing particles such as silica may be dispersed inside optical component 40. It should be noted that optical component 40 may have a lens function for dispersing or condensing the light emitted by light source 20.

Optical component 40 may have a filter function which removes a predetermined wavelength component. Specifically, optical component 40, for example, removes wavelength components less than or equal to 255 nm from the light emitted by light source 20. Here, remove means reducing the intensity of a wavelength component. Specifically, remove means not only completely removing (that is, making the intensity of a wavelength component 0) but also making the intensity of a wavelength component smaller than a predetermined threshold.

Accordingly, the light emitted via optical component 40, that is, the light with which pest control apparatus 10 irradiates the plants, includes substantially no wavelength components less than or equal to 255 nm (UV-C light). Therefore, it is possible to prevent damage to the plant itself, such as leaf scorch, due to the light that the plant is irradiated with.

Furthermore, the light includes a wavelength component that attracts insect pests (insect-attracting effect). Specifically, visible light having a wavelength in the vicinity of 550 nm and UV-A light having a wavelength in a range of from 340 nm to 380 nm, inclusive, have an insect-attracting effect.

In this embodiment, optical component 40 may remove wavelength components larger than 340 nm from the light emitted by light source 20. Accordingly, when the plants are irradiated with the irradiation light, it is possible to prevent insects from being attracted.

Control circuit 50 controls the irradiation conditions of the light emitted by pest control apparatus 10. For example, control circuit 50 controls the irradiation period, the irradiation start (or stop) timing, and the irradiation method (light distribution, etc.). Specifically, control circuit 50 controls the lighting-up and putting-out of light source 20. Control circuit 50 causes light source 20 to light up by supplying light source 20 with the power supplied from battery 60. Control circuit 50 is, for example, a microcontroller.

Control circuit 50 controls the lighting-up and putting-out of light source 20 based on, for example, schedule information stored in a memory (not illustrated in the figures). Specifically, control circuit 50 may have a timer function. The schedule information indicates, for example, the start timing and end timing of light irradiation. The schedule information may indicate the lengths of each of an irradiation period and a non-irradiation period. The schedule information may indicate the ultraviolet light irradiation period and non-irradiation period within a predetermined period such as one day, one week, one month, or one year.

For example, control circuit 50 causes the irradiation of ultraviolet light from light source 20 to continue during a predetermined first period (an irradiation period), and subsequently causes the irradiation of ultraviolet light from light source 20 to stop during a predetermined second period (a non-irradiation period). Control circuit 50 may control light source 20 by alternately repeating the irradiation period and the non-irradiation period. With this, ultraviolet light irradiation and non-irradiation can be performed appropriately, and thus reduction of power consumption and improvement of pest controlling effect can be realized.

Battery 60 is a detachable power source. Battery 60 is housed in housing 32 provided in case 30 and supplies power to light source 20 via control circuit 50. Battery 60 is a primary power source such as an alkaline battery or a manganese battery, but is not limited to such. Battery 60 may be a rechargeable secondary power source.

Switch 70 is a switch for switching between light irradiation and non-irradiation. Switch 70 is, for example, provided exposed to the outside of case 30 and can be operated by a user. Switch 70 is connected to control circuit 50. When switch 70 is operated, control circuit 50 causes light source 20 to emit ultraviolet light or to stop emitting ultraviolet light.

[Advantageous Effects, Etc.]

As described above, pest control apparatus 10 according to this embodiment is a pest control apparatus that controls pests of a plant, and includes case 30 which is portable and light source 20 which is held in case 30 and emits ultraviolet light. Case 30 includes installing structure 31 which is to be installed in the culture medium (specifically, ridge 2) of the plant such that the emission direction of the ultraviolet light emitted by light source 20 is upward.

Accordingly, when pest control apparatus 10 is installed in the culture medium, the emission direction of the ultraviolet light is upward. For example, as illustrated in FIG. 1, pest control apparatus 10 that is installed on ridge surface 2a at the base of plant 3a can irradiate plant 3a with the ultraviolet light from directly below plant 3a. As such, the undersides of the leaves of plant 3a can be directly irradiated with the ultraviolet light. Accordingly, the controlling effect on insect pests, etc., inhabiting the undersides of the leaves is extremely high.

Furthermore, because case 30 which is the main body of pest control apparatus 10 is portable, flexibility and ease of installing is enhanced. Specifically, it is possible to freely change the position at which pest control apparatus 10 is to be installed with respect to the plant to be irradiated with ultraviolet light.

For example, as illustrated in FIG. 1, pest control apparatus 10 is installed on ridge surface 2a at the base of plant 3a, at the right of plant 3a. Accordingly, pest control apparatus 10 can perform ultraviolet light irradiation predominantly on the leaves on the right side of plant 3a. Furthermore, another pest control apparatus 10 is installed on ridge surface 2a at the base of plant 3b, at the left of plant 3b. Accordingly, this pest control apparatus 10 can perform ultraviolet light irradiation predominantly on the leaves on the left side of plant 3b. In this manner, irradiation of ultraviolet light can be performed locally, such as only on a portion of a single plant.

Furthermore, the two pest control apparatuses 10 substantially do not irradiate plant 3c with ultraviolet light. In this manner, even when a plurality of plants 3a to 3c are planted in ridge 2, irradiation of ultraviolet light can be performed locally and not on all of the plurality of plants 3a to 3c. For example, when a plurality of plants of different types are planted on a single ridge 2, irradiation of ultraviolet light can be performed predominantly on the plants with low resistance to pests.

Furthermore, the installation position of pest control apparatus 10 can be easily changed when plants are replanted, etc., or in accordance with the growth of plants. Accordingly, even when the position of the plant itself or the position of the portion to be irradiated such as the underside of the leaves of the plant has changed, pest control apparatus 10 can reliably irradiate the irradiation target with ultraviolet light.

In this manner, according to this embodiment, it is possible to provide a pest control apparatus which is capable of localized ultraviolet light irradiation of plants and has excellent pest controlling effect.

Furthermore, for example, installing structure 31 is flat base 30a of case 30.

Accordingly, base 30a of case 30 can be placed on a flat surface such as ridge surface 2a. For example, by flattening out ridge surface 2a, pest control apparatus 10 can be easily installed. Therefore, since the degree of freedom for installing pest control apparatus 10 is enhanced, it is possible, for example, to flexibly change the ultraviolet light irradiation range with respect to the plant.

For example, pest control apparatus 10 can not only be installed freely within ridge surface 2a but, by forming a mound in a part of ridge surface 2a, pest control apparatus 10 can also be installed on the mound. Accordingly, pest control apparatus 10 can irradiate ultraviolet light from a position that is closer to the underside of the leaves of the plant.

Furthermore, for example, the ultraviolet light is emitted to illuminate a predetermined range centered on the emission direction.

Accordingly, for example, aside from the direction directly above pest control apparatus 10, the surroundings can also be irradiated with ultraviolet light. In other words, the pest controlling effect can be exerted over a wide range.

Furthermore, for example, the ultraviolet light includes UV-B light having a peak wavelength within a range of from 280 nm to 340 nm, inclusive.

Accordingly, the post controlling effect can be enhanced.

Furthermore, for example, case 30 includes housing 32 capable of housing battery 60, and light source 20 emits the ultraviolet light according to power supplied from battery 60 to be housed in housing 32.

Accordingly, since a power supply cord is not needed, the degree of freedom for installing pest control apparatus 10 can be enhanced. For example, pest control apparatus 10 can be freely installed at a place where a commercial power source outlet is not provided.

Furthermore, for example, pest control apparatus 10 further includes control circuit 50 which controls the lighting-up and putting-out of light source 20 based on schedule information that is set in advance.

Accordingly, ultraviolet light irradiation and non-irradiation can be set in advance. Therefore, for example, forgetting to carry out ultraviolet light irradiation, etc., can be reduced, and thus pest control can be carried out properly. Furthermore, for example, since continued over-irradiation of ultraviolet light can be prevented, the operational lifespan of light source 20 of pest control apparatus 10 can be prolonged.

Furthermore, appropriate pest control can be performed while reducing power consumption of pest control apparatus 10.

[Variation 1]

Here, Variation 1 of the embodiment will be described.

Figure 5:
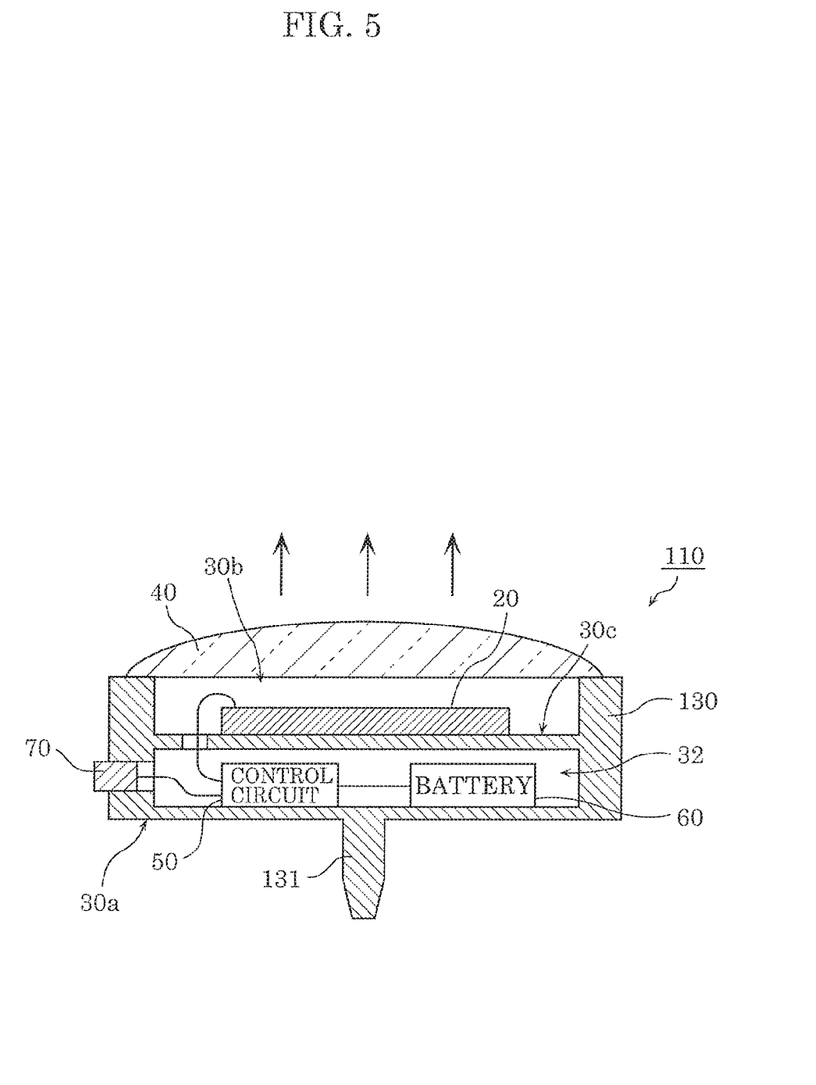
FIG. 5 is a schematic cross-sectional view of the configuration of a pest control apparatus according to Variation 1 of the embodiment.

FIG. 5 is a schematic cross-sectional view of the configuration of pest control apparatus 110 according to this variation. As illustrated in FIG. 5, compared to pest control apparatus 10 illustrated in FIG. 3, pest control apparatus 110 is different in including case 130 in place of case 30. Hereinafter, description will be carried out focusing on the points of difference with the embodiment, and description of common points may be omitted or simplified.

Case 130 includes rod 131 which extends downward from base 30a. Rod 131 is an example of the installing structure. Rod 131 is thrust into the culture medium of the plant. For example, by thrusting rod 131 into ridge 2, case 130 can be fixed to ridge 2.

Rod 131 is an elongated column or prism-shaped rod. The tip of rod 131 is, for example, tapered toward the end, but is not limited to such. The length of rod 131 is not particularly limited, and is for example several centimeters to several tens of centimeters. Rod 131 is formed integrally (as a single component) with case 130 in this variation, but may be a separate piece. Rod 131 which is formed as a separate component from case 130 may be fixed to case 130.

In this manner, in pest control apparatus 110 in this variation, the installing structure is rod 131 which extends downward from base 30a of case 130.

Accordingly, by thrusting rod 131 into ridge 2, etc., sideward movement of case 130 on ridge surface 2a can be prevented. Accordingly, since it is possible to prevent pest control apparatus 110 from moving from the position at which it is installed, ultraviolet light irradiation can be performed locally on a predetermined position of the plant such as the undersides of the leaves.

Case 130 includes one rod 131 in this variation but may include a plurality of rods 131. By thrusting the plurality of rods 131 into ridge 2, movement of pest control apparatus 110 can be more strongly restricted.

[Variation 2]

Next, Variation 2 of the embodiment will be described.

Figure 6:
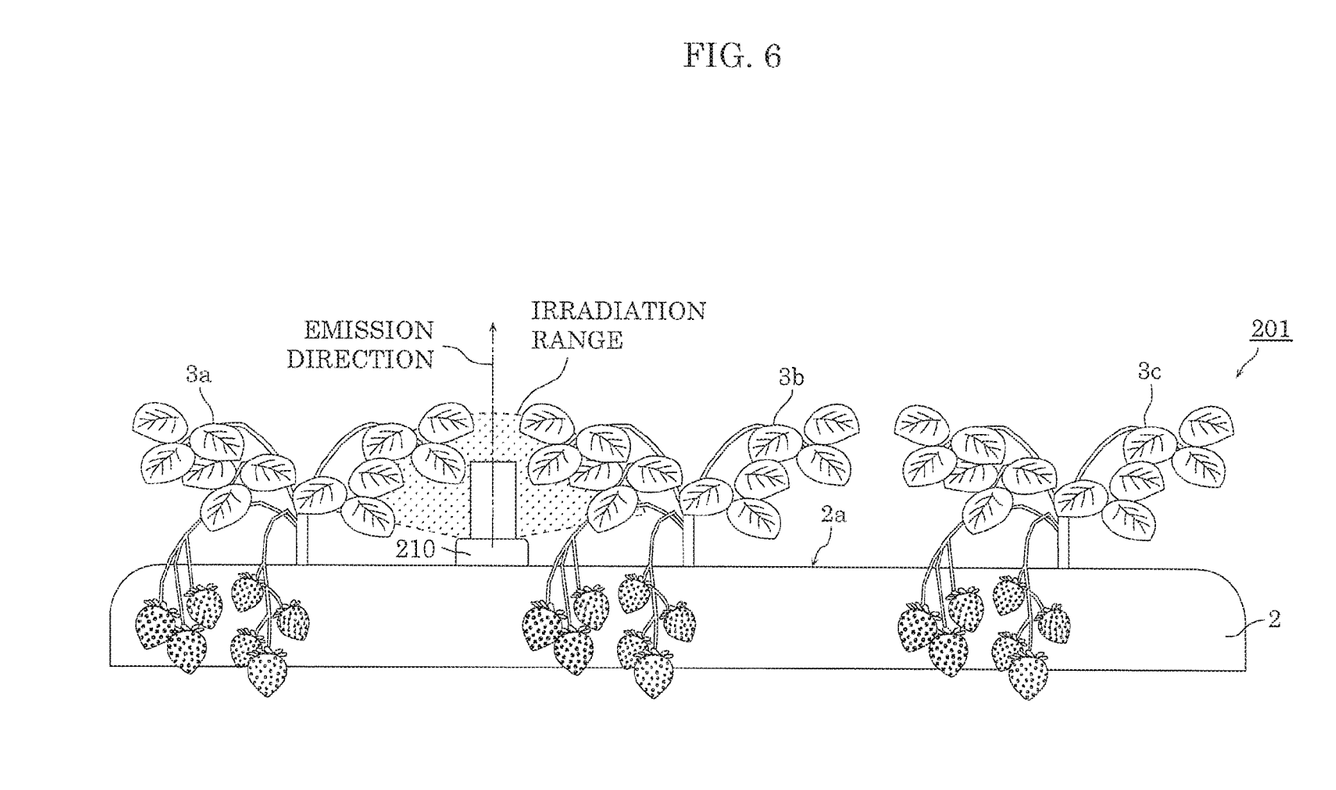
FIG. 6 is a schematic diagram illustrating a pest control system including a pest control apparatus according to Variation 2 of the embodiment.
Figure 7:
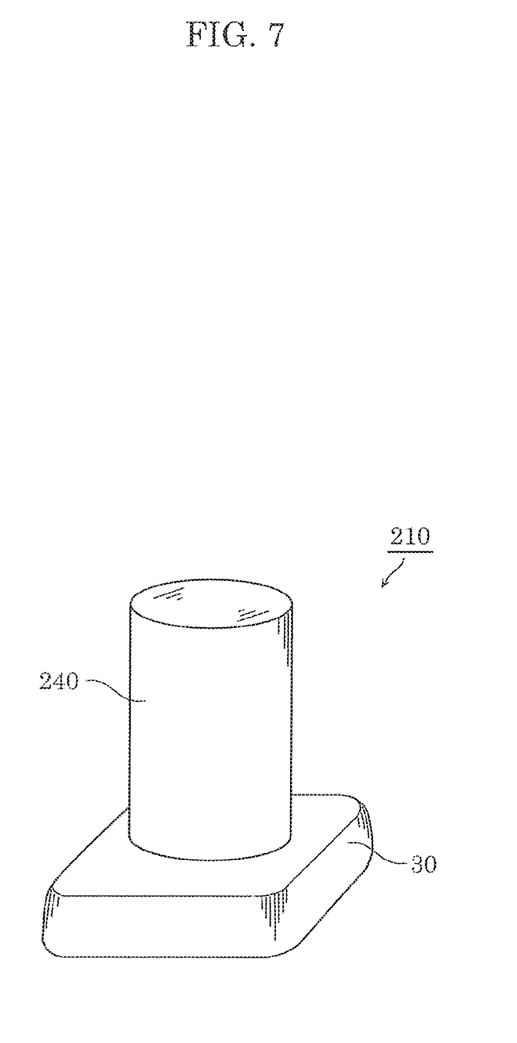
FIG. 7 is an outline perspective view of the pest control apparatus according to Variation 2 of the embodiment.

FIG. 6 is a schematic diagram illustrating pest control system 201 according to this variation. FIG. 7 is an outline perspective view of pest control apparatus 210 according to this variation.

As illustrated in FIG. 6 and FIG. 7, compared to pest control apparatus 10 illustrated in FIG. 1 and FIG. 2, pest control apparatus 210 is different in terms of external form and ultraviolet light irradiation range. Specifically, as illustrated in FIG. 7, pest control apparatus 210 includes optical component 240 in place of optical component 40. Hereinafter, description will be carried out focusing on the points of difference, and description of common points may be omitted or simplified.

Optical component 240 is, for example, an elongated cylindrical light guide. One longitudinal end surface (bottom face) of optical component 240 is disposed to cover opening 30b of case 30. The ultraviolet light emitted by light source 20 enters the bottom face of optical component 240. Optical component 240 emits the light which has entered from the one longitudinal end face (bottom face), from the other end face (top face) and the lateral face (i.e., a circumferential surface).

Accordingly, aside from the direction directly above (vertically above) optical component 240, the ultraviolet light can emitted over a predetermined range including vertically above. Specifically, pest control apparatus 210 can emit ultraviolet light over a wider range than pest control apparatus 10 according to the embodiment. The irradiation range of the ultraviolet light from pest control apparatus 210 is, for example, a range in which the irradiation angle of the ultraviolet light is at least 90 degrees in the cross-section including the optical axis direction (light emission direction) which is vertically above.

For example, as illustrated in FIG. 6, by placing pest control apparatus 210 between plant 3a and plant 3b, two plants 3a and 3b can be irradiated at the same time. Accordingly, the number of pest control apparatuses 210 that are installed on ridge surface 2a can be reduced, and thus power consumption can be reduced. Furthermore, since ultraviolet light irradiation can be carried out from the sides of plants 3a and 3b, ultraviolet light irradiation can be performed not only on the undersides of the leaves but also on the stems, etc.

It should be noted that the shape of optical component 240 is not limited to the example shown in the figures, and may be prismatic or test tube-shaped in which the tip is rounded. Furthermore, light-diffusing particles may be dispersed, or a diffusing structure such as minute bumps and grooves may be provided, in optical component 240. Optical component 240 is formed using, for example, a glass material such as quartz glass.

It should be noted that, in this variation, light source 20 may be disposed inside optical component 240. For example, light source 20 may be a light bulb-type lamp having a base held in case 30 and a light-emitter disposed inside optical component 240.

The ultraviolet light emitted from optical component 240 may be emitted in a direction parallel to ridge surface 2a. Furthermore, part of the ultraviolet light emitted from optical component 240 may be omitted obliquely downward such that ridge surface 2a may be irradiated.

[Variation 3]

Next, Variation 3 of the embodiment will be described.

Figure 8:
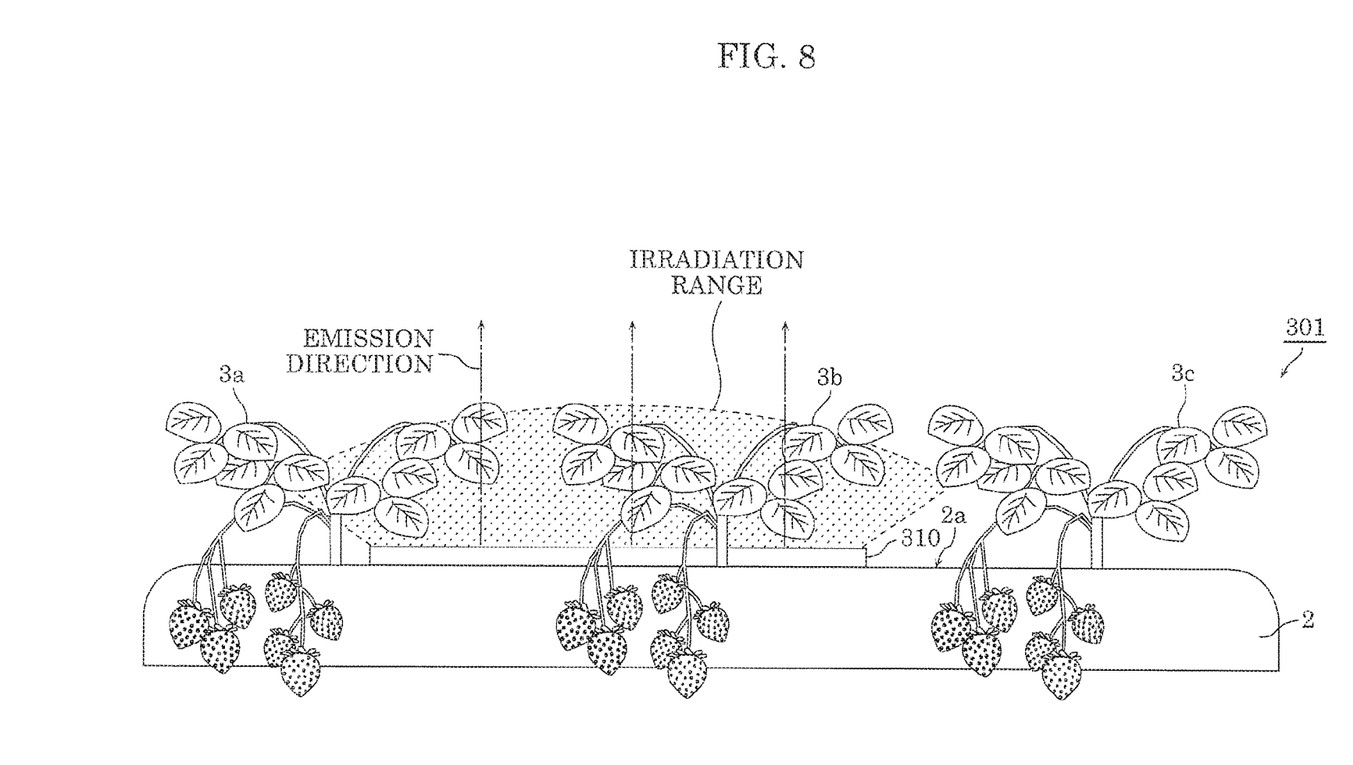
FIG. 8 is a schematic diagram illustrating a pest control system including a pest control apparatus according to Variation 3 of the embodiment.
Figure 9:
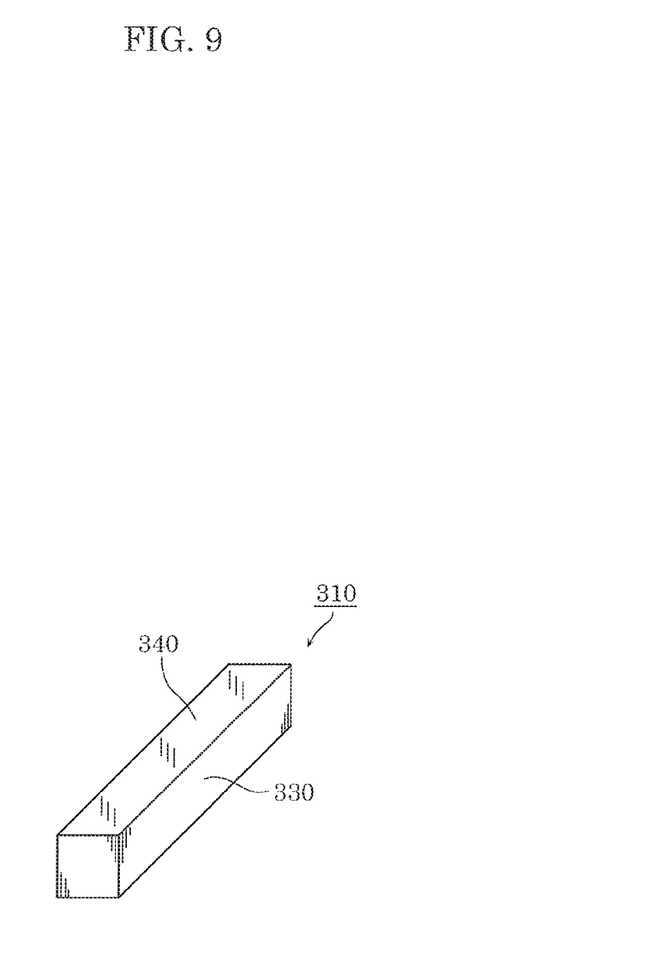
FIG. 9 is an outline perspective view of the pest control apparatus according to Variation 3 of the embodiment.

FIG. 8 is a schematic diagram illustrating pest control system 301 according to this variation. FIG. 9 is an outline perspective view of pest control apparatus 310 according to this variation.

As illustrated in FIG. 8 and FIG. 9, compared to pest control apparatus 10 illustrated in FIG. 1 and FIG. 2, pest control apparatus 310 is different in terms of external form and ultraviolet light irradiation range. Specifically, as illustrated in FIG. 9, pest control apparatus 310 includes case 330 and optical component 340 in place of case 30 and optical component 40. Hereinafter, description will be carried out focusing on the points of difference, and description of common points may be omitted or simplified.

Case 330 is a main body case that is elongated in a direction orthogonal to the emission direction (optical axis direction) of light from light source 20. Case 330 is, for example, an elongated rectangular parallelepiped container. An opening is provided on the top face of case 330, and optical component 340 is provided to block the opening. The opening is provided along the longitudinal direction of case 330. As in the embodiment, light source 20, control circuit 50, and battery 60, etc., are housed inside case 330. Pest control apparatus 310 according to this embodiment emits ultraviolet light in the shape of a line along the longitudinal direction, via the opening provided in the top face of case 330.

Optical component 340 is a component which is provided to block the opening of case 330 and transmits ultraviolet light. In this variation, optical component 340 is, for example, a rectangular plank in plan view, but is not limited to such. Optical component 340 may have a lens function. Optical component 340 is formed using, for example, a glass material such as quartz glass.

It should be noted that the entirety of case 330 may be configured using a component that transmits ultraviolet light. For example, pest control apparatus 310 may be a straight-tube lamp that emits ultraviolet light.

As described above, in pest control apparatus 310 according to this variation, case 330 is elongated in a direction orthogonal to the emission direction of the ultraviolet light.

Accordingly, since the irradiation range of the light from pest control apparatus 310 becomes wider, a plurality of plants can be irradiated with ultraviolet light. Specifically, pest control apparatus 310 emits ultraviolet light in the shape of a line. For example, as illustrated in FIG. 8, case 330 is placed on ridge surface 2a so as to be parallel to the direction in which ridge 2 extends. Accordingly, a single pest control apparatus 310 can irradiate the plurality of plants 3a to 3c with ultraviolet light. Accordingly, the number of pest control apparatuses 310 that are installed on ridge surface 2a can be reduced, and thus power consumption can be reduced.

[Others]

Although the pest control apparatus according to the present invention is described thus far based on the foregoing embodiment and the variations thereof, the present invention is not limited to the foregoing embodiment.

For example, the culture medium of the plants uses soil in the foregoing embodiment, but is not limited to such. For example, nutriculture such as hydroponic culture or solid culture medium may be used. In this case, the culture medium of the plant is the container which holds the plant. The pest control apparatus is installed in the container, etc.

Furthermore, for example, the installing structure is exemplified by base 30a and rod 131 in the foregoing embodiment, but is not limited to such.

For example, the case may have a flexible linear portion which can be wound around the plant.

Furthermore, for example, the pest control apparatus is exemplified as including optical components 40, 240, or 340 in the foregoing embodiment and the variations thereof, but is not limited to such. The pest control apparatus need not include optical component 40, etc. For example, light source 20 may be a light bulb-type or straight tube lamp, and the fluorescent tube may be exposed to the outside. In this case, the glass material making up the fluorescent tube may have a filter function for wavelength component blocking.

Furthermore, for example, pest control apparatus 10 is exemplified as including battery 60 in the foregoing embodiment, but is not limited to such. Pest control apparatus 10 may have a power supply cord (plug) and be supplied with power from a commercial power source. Accordingly, it is possible to prevent the loss of pest controlling effect due to a dead battery, etc.

Furthermore, pest control apparatus 10 may include a solar cell in place of battery 60. Accordingly, pests control can be performed without supply of power from the outside. Furthermore, pest control apparatus 10 may be connectable to an external power source such as a storage battery, and may irradiate ultraviolet light using power supplied from the external power source.

Furthermore, for example, pest control apparatus 10 need not include control circuit 50, switch 70, etc. For example, pest control apparatus 10 may include a wireless communication module instead. Pest control apparatus 10 may receive a control signal for controlling the lighting-up and putting-out of light source 20 from an external controller (or a server device), etc., via wireless communication such as Wi-Fi (registered trademark), Bluetooth (registered trademark), etc. Pest control apparatus 10 may control the lighting-up and putting-out of light source 20 based on the control signal received.

Furthermore, in the foregoing embodiment, structural components such as control circuit 50 and switch 70 may be configured using dedicated hardware or may be implemented by executing software programs suitable for the respective structural components. Each of the structural components may be implemented by a program executing component, such as a central processing unit (CPU) or processor, reading and executing a software program recorded on a recording medium such as a hard disc or a semiconductor memory.

It should be noted that the present invention can be implemented not only as a pest control apparatus but also as a program which includes, as steps, the processes performed by the respective structural components of the pest control apparatus, and a computer-readable recording medium on which such program is recorded, such as a digital versatile disc (DVD), etc.

Specifically, the above-described generic or specific aspects may be implemented as a system, an apparatus, an integrated circuit, a computer program, and a computer-readable recording medium, and may be implemented by an arbitrary combination of a system, an apparatus, an integrated circuit, a computer program, and a recording medium.

Forms obtained by various modifications to the embodiment that can be conceived by a person of skill in the art as well as forms realized by arbitrarily combining structural components and functions in the embodiment which are within the scope of the essence of the present invention are included in the present invention.

What is claimed is:

1. A pest control apparatus that controls a pest of a plant, the pest control apparatus comprising:
    a main body case defined by a generally flat container, the main body case being portable and having a top face provided with an opening, and
    the main body case having an inner base that defines an elevated placement face within the generally flat container and an outer base that defines a bottom exterior surface of the generally flat container;
    a light source housed inside the main body case and configured to emit ultraviolet light toward the opening, wherein the light source is placed on top of the elevated placement face, wherein
    the main body case is configured to be installed on a culture medium of the plant such that an emission direction of the ultraviolet light emitted by the light source is upward;
    an optical component having an elongated shape that extends between a first end surface of the optical component and a second end surface of the optical component, the elongated shape defining a circumferential surface of the optical component,
    the first end surface of the optical component covers the opening such that the ultraviolet light emitted by the light source enters the first end surface of the optical component and is emitted from the circumferential surface and the second end surface of the optical component,
    wherein a longitudinal axis of the elongated shape extends generally perpendicular to the top face of the main body case, the elongated shape being defined by a cylinder having a diameter and a length that extends in a direction of the longitudinal axis,
    wherein the length of the cylinder is larger than the diameter of the cylinder,
    wherein the optical component removes a wavelength component larger than 340 nm from the ultraviolet light emitted by the light source, and wherein
    the optical component at least removes visible light having a wavelength of 550 nm; and
    the main body case is capable of housing a battery that provides a power supply in a space provided between the elevated placement face and the bottom exterior surface of the generally flat container, and
    the light source is configured to emit the ultraviolet light according to the power supply.

2. The pest control apparatus according to claim 1, wherein
    the main body case is provided with a rod extending downward from the outer base and configured to be inserted into the culture medium so as to install the main body case on the culture medium.

3. The pest control apparatus according to claim 1, wherein
    the outer base is flat and is configured to install the main body case on the culture medium.

4. The pest control apparatus according to claim 1, wherein
    the ultraviolet light is emitted to illuminate a region centered on the emission direction.

5. The pest control apparatus according to claim 1, wherein
    the ultraviolet light includes UV-B light having a peak wavelength within a range of 280 nm to 340 nm.

6. The pest control apparatus according to claim 1, wherein
    the main body case is elongated in a direction orthogonal to the emission direction.

7. The pest control apparatus according to claim 1, further comprising:
    a control circuit that controls lighting-up and putting-out of the light source based on schedule information that is set in advance.

8. The pest control apparatus according to claim 1, further comprising:
    the first end surface of the optical component being configured to allow passage of the ultraviolet light in the direction of the longitudinal axis, and
    the circumferential surface being configured to allow passage of the ultraviolet light in a lateral direction with respect to the direction of the longitudinal axis.

* * * * *